UNITED STATES PATENT OFFICE.

DOMINIQUE DUPRAT, OF NEW YORK, N. Y.

IMPROVED HAIR-DYE.

Specification forming part of Letters Patent No. 40,918, dated December 15, 1863.

*To all whom it may concern:*

Be it known that I, DOMINIQUE DUPRAT, of the city, county, and State of New York, have invented a new and Improved Hair-Dye; and I do hereby declare that the following is a full, clear, and exact description of the same.

This invention consists in a composition of pomade or fat scented with some perfume, nitrate of silver, and gallic acid, mixed together in about the proportion and in the manner hereinafter specified, for the purpose of producing a hair-dye capable of restoring their original color to hairs of all shades. The proportion in which I use these ingredients together is about as follows: pomade, five hundred parts, by weight; nitrate of silver, thirty parts; gallic acid, ten parts. This pomade is prepared in the ordinary manner of perfectly-refined fat, scented with some suitable perfume, and it is mixed with the nitrate of silver and with the gallic acid by stirring until all the ingredients are intimately and evenly combined.

In order to facilitate the combination between the nitrate of silver and gallic acid with the pomade, both the nitrate and the acid are first dissolved, either in water or in any other suitable liquid, and in order to prevent the decomposition of the nitrate of silver by the gallic acid they may be stirred into the pomade separately, one after the other. The operation of mixing the ingredients together, however, is very simple, and does not require any particular care. It can be performed by hand or by suitable machinery, and when thoroughly mixed the composition is put up in suitable bottles or vials, ready for sale.

By this composition or dye hairs of any variety of shades can be readily restored to their original color. The dye is not injurious to the skin, and it keeps the hair smooth and pliable, the same as ordinary pomade or hair oil.

What I claim as new, and desire to secure by Letters Patent, is—

A hair-dye composed of the ingredients herein specified, and mixed together substantially in the manner and about in the proportion set forth.

D. DUPRAT.

Witnesses:
   THOS. S. J. DENGLAR,
   GEO. W. REED.